June 2, 1931.     C. W. KUBON     1,807,849
BUTTER CUTTER
Filed May 18, 1929     4 Sheets-Sheet 1

Inventor
Clifford W. Kubon
By his Attorneys

June 2, 1931. C. W. KUBON 1,807,849
BUTTER CUTTER
Filed May 18, 1929 4 Sheets-Sheet 2

Inventor
Clifford W. Kubon
By his Attorneys
Merchant and Kilgore

June 2, 1931.  C. W. KUBON  1,807,849
BUTTER CUTTER
Filed May 18, 1929   4 Sheets-Sheet 3
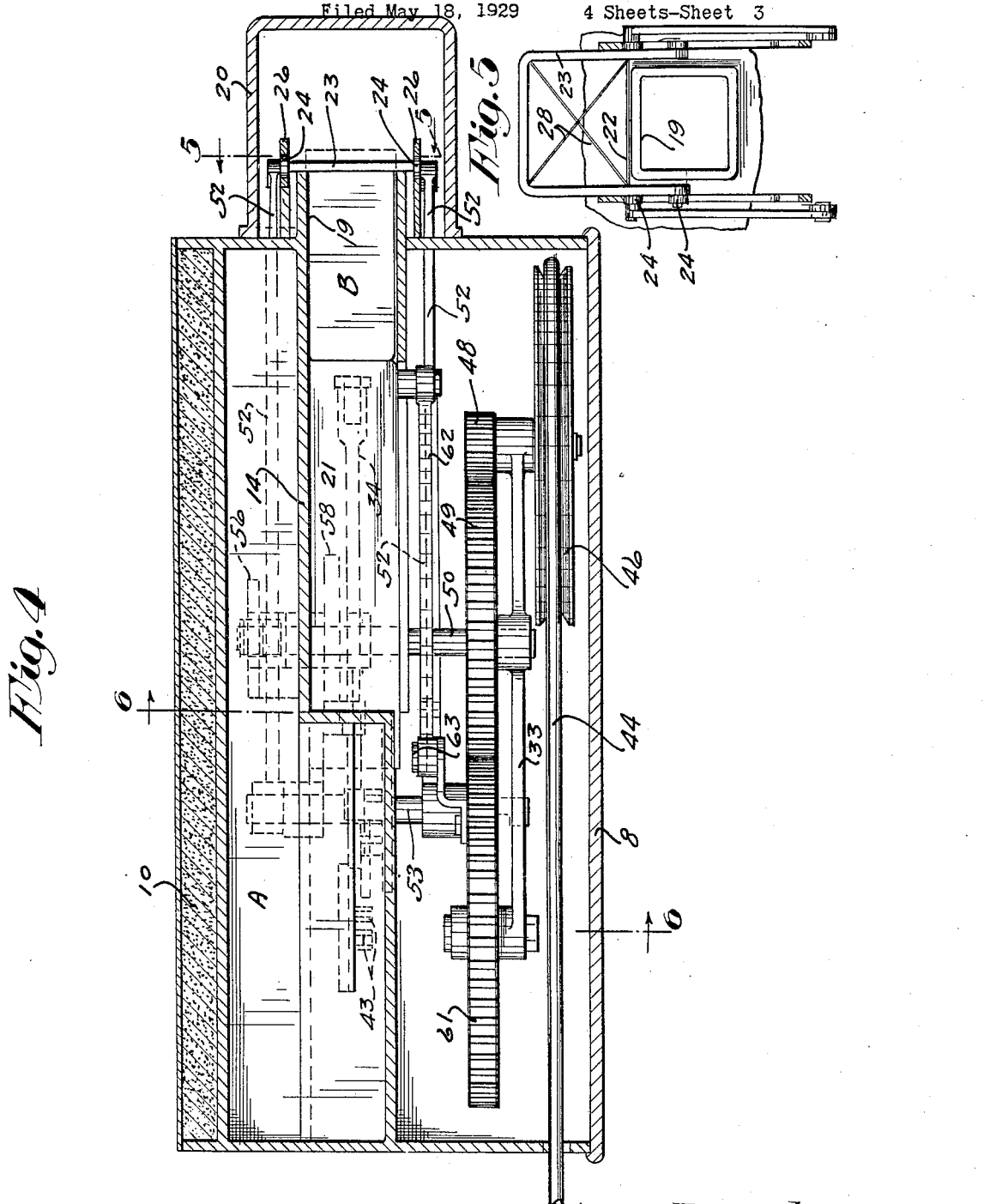
Inventor
Clifford W. Kubon
By his Attorneys
Merchant and Kilgore

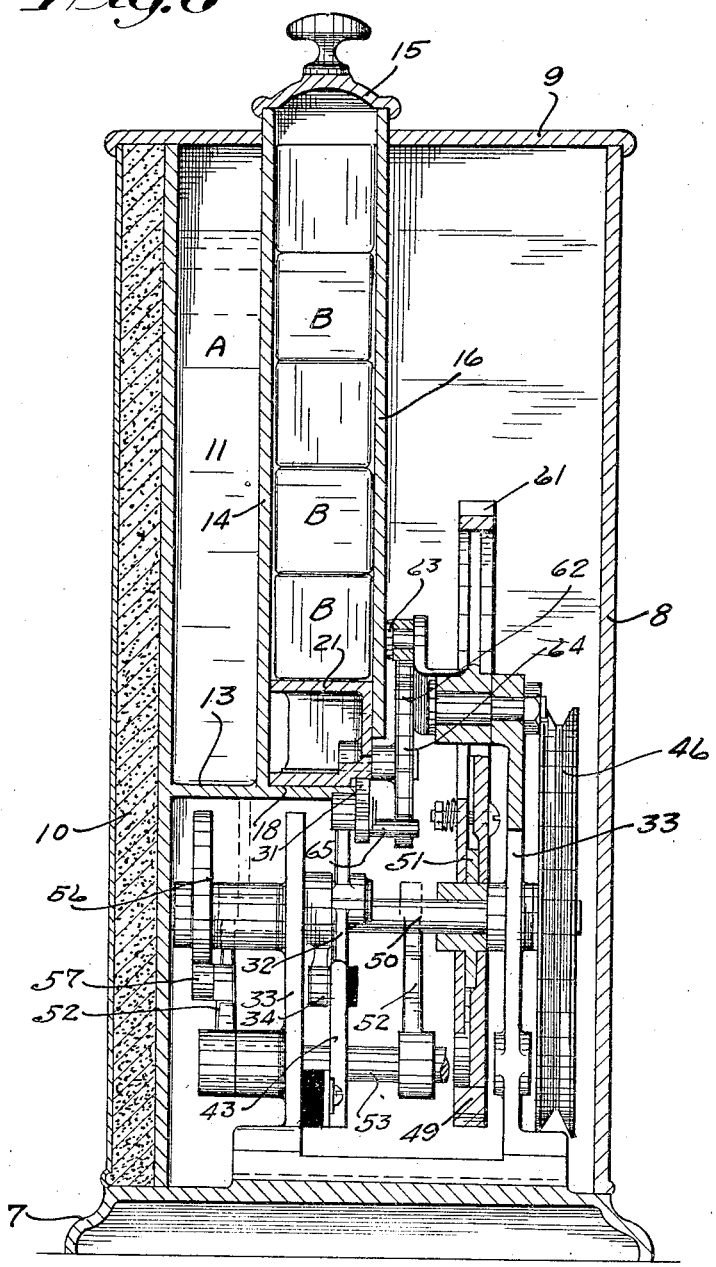

Patented June 2, 1931

1,807,849

UNITED STATES PATENT OFFICE

CLIFFORD W. KUBON, OF MINNEAPOLIS, MINNESOTA

BUTTER CUTTER

Application filed May 18, 1929. Serial No. 364,208.

My invention has for its object to provide a highly efficient cutting or slicing machine intended for general use but especially well adapted, as illustrated, for use in hotels, restaurants and the like for successively cutting from a brick, cake or bar of butter slices or pieces to be served to the patrons.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 4 is a view partly in plan and partly in horizontal section taken on the irregular line 4—4 of Fig. 3;

Fig. 5 is a fragmentary detail view with some parts sectioned on the line 5—5 of Fig. 4; and Fig. 6 is a transverse vertical section taken substantially on the irregular line 6—6 of Fig. 4.

Figure 1:
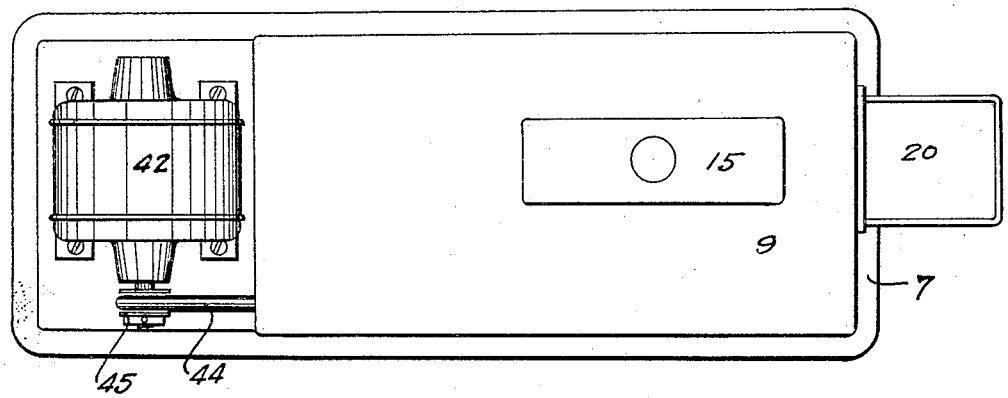
Fig. 1 is a plan view of the butter cutter.
Figure 2:
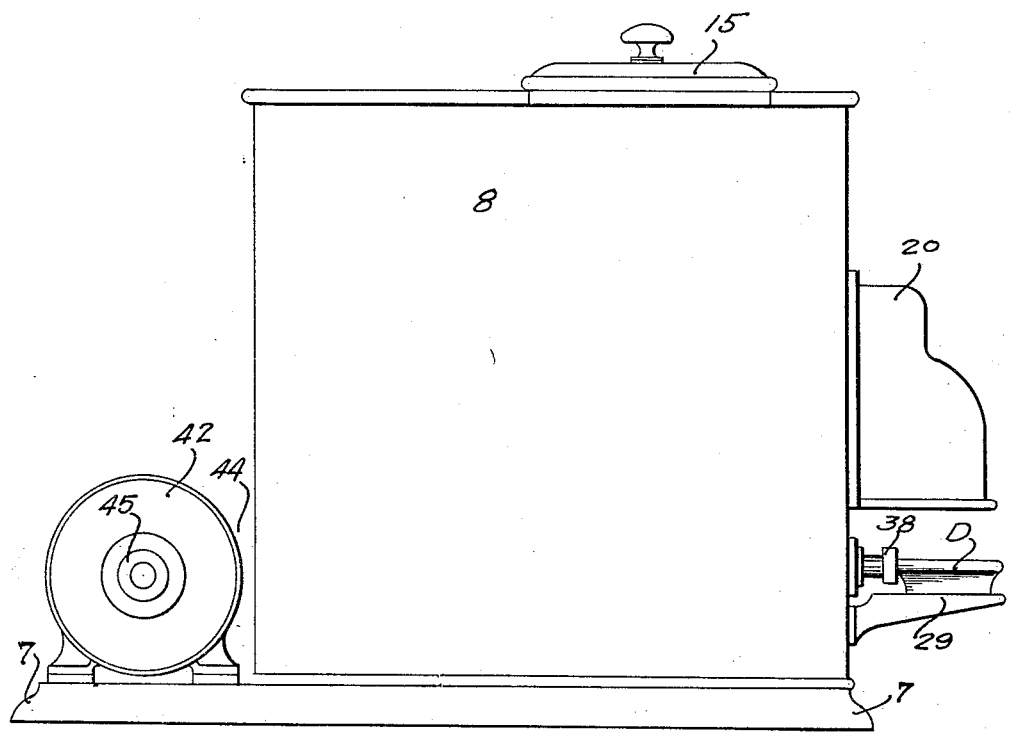
Fig. 2 is a front elevation of the same.

The numeral 7 indicates a rectangular base on which is mounted a relatively high rectangular casing 8 which terminates short of the rear portion of said base. This casing 8 has an open top normally closed by a displaceable cover 9 having a capping flange into which the upper end of said casing extends. The right side of the casing is formed by two laterally spaced walls and an insulation 10 therebetween.

Within the casing 8 at the right hand and upper portion thereof is a refrigerator compartment 11 for holding cracked ice or ice water A to keep the butter at the desired temperature. This compartment 11 is formed between the right side of the casing 8 and a wall member 12 which extends from the front to the rear of said casing at substantially the transverse center thereof and the bottom member 13 of said casing is spaced materially above the base 7. Said compartment 11 is normally closed by the cover 9 and its wall 12 is recessed to form an upright magazine 14 which extends above the casing 8 through an aperture in the cover 9 and is normally closed by the displaceable cover 15 having a capping flange into which said magazine extends. The left side of the magazine 14 is normally closed by a displaceable plate 16 held in position by screws 17. The magazine 14 is of such shape in horizontal section as to hold a plurality of quarter pound bars of butter B supported the one upon the other longitudinally of the casing 8.

The lowermost bar of butter B rests in a way 18 formed in part by the bottom of the magazine 14 and in part by a rear extension thereof. At the bottom of the magazine 14 is a discharge throat 19 which forms a forward extension of the way 18 and extends through the front wall of the casing 8 and outward thereof, see Fig. 4. This discharge throat 19 in cross section is of such size as to permit the lowermost bar of butter B to be fed longitudinally therethrough from the magazine 14.

Attached to the front wall of the casing 8 is a hood 20 which covers the outer end of the discharge throat 19. A ram 21 of the same general shape as one of the bars of butter B is slidably mounted on the way 18 for feeding the lowermost bar of butter B from the magazine and through the discharge throat 19 to a cutter, as will presently appear, and for supporting the overlying bars of butter B.

Figure 3:
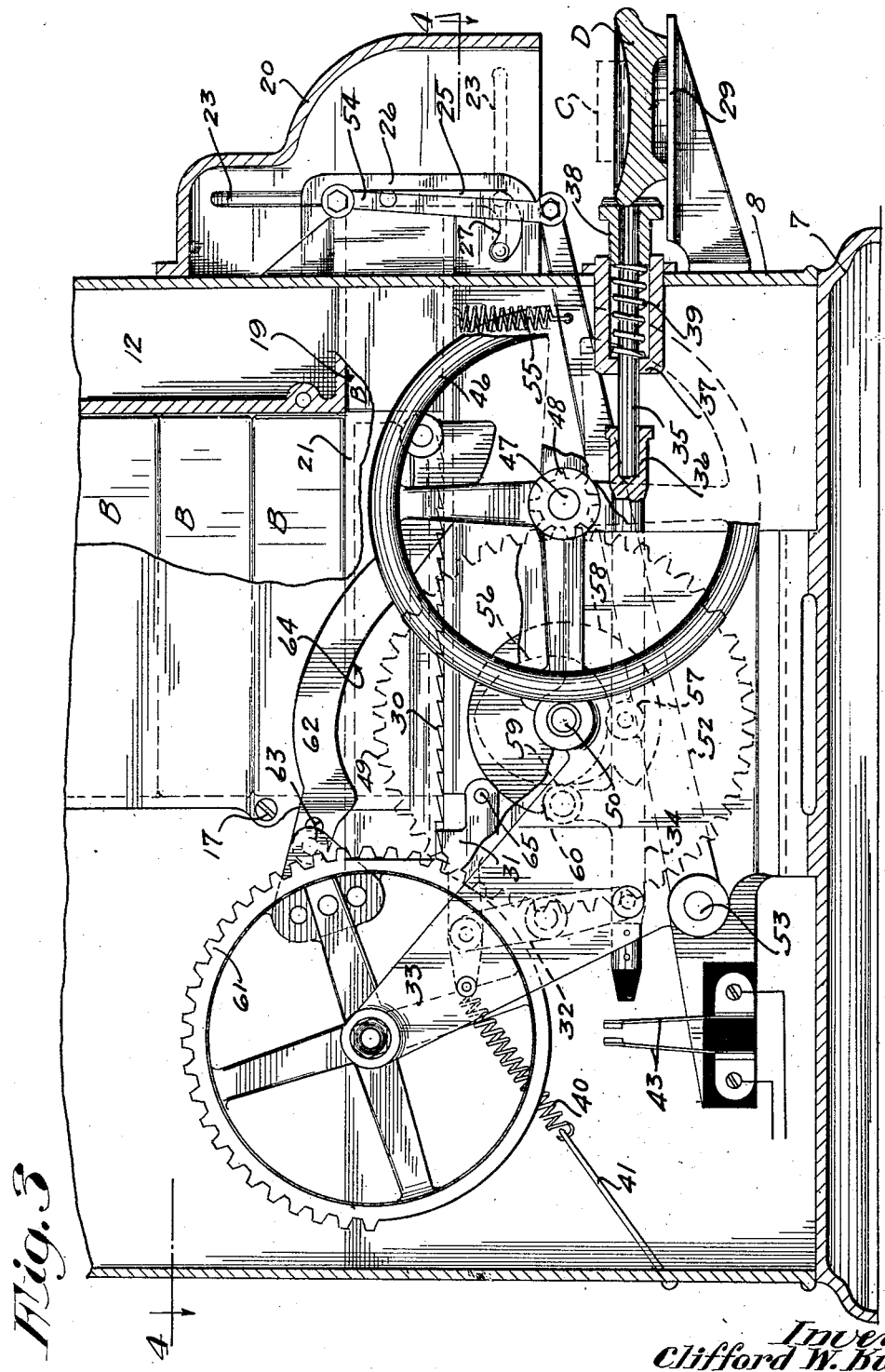
Fig. 3 is a view in longitudinal vertical central section, on an enlarged scale, with some parts broken away.

Pieces of butter C are cut from the bar B in the discharge throat 19 and at the outer end thereof by a cutting wire 22 secured at its ends to the legs of an upright yoke-like frame 23. This frame 23 is held for raising and lowering movements and for outward swinging movement into a horizontal position when in its lowermost position, as indicated by broken lines in Fig. 3, by upper and lower pairs of roller-equipped studs 24. These studs 24 are mounted to travel in guide slots 25 formed in bearing plates 26 on the front end of the casing 8 with the discharge throat 19 therebetween. These guide slots 25 have at their lower ends rearwardly extended segmental extensions 27.

The cutting wire 22 works close to the outer end of the discharge throat 19 as a shearing edge and normally is above said throat, see Fig. 5, so as to not interfere with the projecting movement of the bar of butter B therethrough. At the completion of the cutting of a piece of butter C from the bar B the lower pair of roller-equipped studs 24 enter the slot extensions 27 and swing the frame 23 forward into a horizontal position, as indicated by broken lines in Fig. 5. A pair of cross wires 28 attached at their ends to the frame 23 above the wire 22 hold the piece of butter C out of contact with the bar B as it is being cut therefrom to prevent the same from adhering thereto. These cross wires 28 also turn the piece of butter C after it is cut from the bar B into a horizontal position from which it is precipitated onto a butter dish D. On the front of the casing 8 below the hood 20 is a shelf 29 for supporting the butter dish D to receive the piece of butter C as the same is cut from the bar B.

The following connections are provided for manually operating the ram 21 to impart a step of movement to the bar of butter B which determines the thickness of the pieces C to be cut therefrom by the wire 22, to wit: On the bottom of the ram 21 at the left side thereof is a longitudinal row of ratchet teeth 30 and a co-operating dog 31 is intermediately pivoted to the upper end of an upright lever 32 which, in turn, is intermediately pivoted to a frame 33 on the base 7.

Successive operative movements are imparted to the dog 31 to project the ram 21 on the way 18 by a horizontal plunger comprising an inner section 34 and an outer section 35 and which plunger extends longitudinally of the casing 8. The plunger sections 34—35 are connected by a slip joint 36 and the outer section 35 is mounted in a seat in the inner end of a thimble-like bearing 37 for endwise sliding movement and which bearing is mounted in the front of the casing 8. Said plunger section 34 at its inner end portion is pivoted to the lower end of the lever 32 and supported therefrom for endwise movement. A head 38 is applied to the outer end of the plunger section 35 and overlies the shelf 29 in position to be engaged by a butter plate D at the time it is placed on said shelf. Encircling the plunger section 35 within the bearing 37 is a coiled spring 39 compressed between the inner end of said bearing and the head 38 and yieldingly holds said plunger section forwardly retracted.

A coiled spring 40 attached to the rear or short end of the dog 31 is anchored by a rod 41 to the rear end of the casing 8. This spring 40 yieldingly holds the dog 31 raised and retracted for engagement with one of the ratchet teeth 30 and at the same time will permit said dog to yield and ride over said teeth during its retracting movement. Said spring 40 also yieldingly holds the plunger section 34 retracted. At the time a butter plate D is placed on the shelf 29 to receive a piece of butter C said plate is pressed against the head 38 with sufficient force to project the plunger 34—35 against the tension of the springs 39 and 40 and thereby rock the lever 32 to project the dog 31 and engage one of the ratchet teeth 30 and thereby impart a step of forward movement to the ram 21. This projecting movement of the ram 21 moves the bar of butter B in the discharge throat 19 a distance to project the outer end thereof from said throat and be cut therefrom by the wire 22.

Connections operated from an electric motor 42 are provided for actuating the cutting wire 22 and for retracting the ram 21 at the completion of its projecting movement. This retracting movement of the ram 21 is such as to move said ram completely out of the magazine 14 and allow the bars of butter B therein to move downward and position the lowermost one thereof in the way 18 between said ram and the bar of butter B in the discharge throat 19. The motor 42 is mounted on the base 7 at the rear of the casing 8 and a control switch 43 therefore is mounted in the casing 8 and includes a pair of upright normally open spring contact fingers, see Fig. 3. At the time the plunger 34—35 is projected, by pressing a butter plate D against its head 38 to impart a step of movement to the ram 21, the inner section of said plunger, which is insulated, engages the front contact finger of the switch 43 and springs the same against the rear contact finger of said switch to close the switch and start the motor 42.

A belt 44 runs over a small grooved pulley 45 on the shaft of the motor 42 and a large grooved pulley 46 keyed to the left hand end of a short transverse shaft 47 journaled in a bearing on the frame 33. Keyed to the right hand end of the shaft 47 is a spur pinion 48 which meshes with a large spur gear 49 which is connected by an overrunning clutch 51 to the left hand portion of the transverse shaft 50. This transverse shaft 50 is journaled in bearings in the frame 33.

The frame 23 is raised and lowered by a pair of long laterally spaced horizontal arms 52 which extend longitudinally of the casing 8. These arms 52 at their rear ends are mounted on a transverse shaft 53, journaled in bearings on the frame 33, for vertical swinging movement. Upright links 54 connect the forward ends of the arms 52 to the frame 23 at the upper pair of roller-equipped studs 24. A pair of coiled springs 55 normally and yieldingly hold the arms 52 raised and hence the cutting wire 22. These springs 55 are attached to the arms 52 just back of the front of the casing 8 and anchored to the bottom member 13.

To depress the arms 52 and thereby cause the wire 22 to produce a cutting action, there is mounted on the shaft 50 a pair of heart-shaped cams 56 and co-operating cam rollers 57 are journaled on said arms and arranged to run on the peripheries of the cams 56. The springs 55, of course, are under strain to hold the arms 52 raised with their cam rollers 57 contacting with the peripheries of the cams 56. To hold the plunger section 34 projected to keep the switch 43 closed for a predetermined period of time and permit the motor 42 to operate the connections driven therefrom and cause the cams 56 to make one complete rotation, there is mounted on the shaft 50 a wheel 58 and a co-operating roller-equipped stud 59 is mounted on the plunger section 34. This wheel 58 is provided with a circumferentially extended notch 60 into which the roller-equipped stud 59 normally extends to permit the spring 40 to hold the plunger section 34 retracted, see Fig. 3. During the initial movement of the wheel 58 after the motor 42 has been started, its notch 60 passes beyond the roller-equipped stud 59 so that when pressure is released on the head 38 by the butter plate D the roller-equipped stud 59 travels on the periphery of the wheel 58 and thereby holds the plunger section 34 projected with the switch 43 closed.

After the wheel 58 has made substantially a complete rotation the roller-equipped stud 59 drops into the notch 60 and thereby releases the held plunger section 34 and permits the spring 40 to retract the same and at which time the spring switch 43 opens and breaks the circuit to the motor 42. After the roller-equipped stud 59 drops into the notch 60 the wheel 58 will continue to move until the approaching shoulder formed by the notch 60 engages the roller-equipped stud 59 as a positive stop. As the wheel 58 is keyed to the shaft 50 the rotation of said shaft will stop with the wheel 58 and thereafter the spur gear 49 will be moved for a short distance by the motor 42 and at which time the clutch 51 permits said spur gear to turn about the axis of the shaft 50.

To retract the ram 21 after a bar of butter B has been completely fed from the magazine 14 and into the discharge throat 19, there is provided an intermittent gear 61 journaled on the frame 33 and arranged to mesh with the gear 49. A horizontal link 62 connects the gear 61 to the ram 21 by having its forward end pivoted to the left side of the ram 21 at the front thereof and its other end attached to the gear 61 at the periphery thereof by a loose connection 63 comprising a pin on said gear and a slot in the link 62. The lower edge of the link 62 is shaped to form a longitudinally extended cam surface 64 arranged to engage a laterally projecting pin 65 on the dog 31 and move said dog into an inoperative position against the tension of the spring 40 and hold said dog inoperative during the retracting movement of the ram 21 and then release the same.

*Operation*

To fill the magazine 14 with bars of butter B the machine is adjusted to retract the ram 21 completely out of said magazine and permit the lowermost bar B to rest on the way 18 forward of the ram 21 and longitudinally aligned with the discharge throat 19. In this position of the ram 21 the toothed portion of the gear 61 has just moved out of mesh with the gear 49. After the first operation of the machine there will always be a section of a bar of butter B in the discharge throat 19. The other movable parts of the machine are normally positioned, as shown in the drawings.

To cut a piece of butter C from the bar B in the discharge throat 19 a butter plate D is placed on the shelf 29, pressed against the head 38 with sufficient force to project the plunger 34—35 to operate the dog 31 and impart a step of forward movement to the ram 21 and feed the bars of butter B on the way 18 to project the forward end of the bar B in said throat outward thereof a distance corresponding to the thickness of the piece of butter to be cut therefrom. During the projecting movement of the ram 21 it imparts a step of rotary movement to the gear 61, which is out of mesh with the gear 49 by its link 62.

In addition to the operative movement imparted to the dog 31 by the projecting movement of the plunger 34—35 the roller-equipped stud 59 is moved out of the notch 60 and the switch 43 closed by said plunger. As the switch 43 is closed the motor 42 is operated and thereby rotates the shaft 50 and hence the gear 49, cams 56 and wheel 58 thereon. During the initial movement of the wheel 58 it passes in front of the roller-equipped stud 59 and thereby holds the plunger section 34 projected and keeps the switch 43 closed. When the pressure of the butter plate D is released from the head 38 the spring 39 returns the plunger section 35 to normal position which is permitted by the slip connection 36.

During the rotation of the cams 56 the arms 52 are first moved downward thereby operating the frame 23 to cause the cutting wire 22 to cut a piece of butter C from the bar B. At the completion of this cutting action the lower pair of roller-equipped studs 24 enter the curved lower end portions 27 of the slots 25 and swing the frame 23 into a horizontal position to precipitate the piece of butter C that has just been cut onto the underlying butter plate D. During the return movement of the cams 56 the springs 55 lift the arms 52 and thereby return the frame 23 to normal position.

The last step of rotary movement imparted to the gear 61 by the ram 21 through its link connection 62 will bring the gear 61 into mesh with the gear 49. During the initial movement of the gear 61 by the gear 49 the loose connection 63 will cause the ram 21 to remain stationary. As the link 62 is carried downward by the gear 61 its cam surface 64 engages the pin 65 on the dog 31 and thereby moves said dog, against the tension of the spring 40, into an inoperative position. Continued movement of the gear 61 acting through the link 62 will move the ram 21 rearward out of the magazine 14 and during this movement of the link 62 its cam 64 has held the dog inoperative. At the completion of the retracting movement of the ram 21 the link 62 will be lifted by the gear 61 and thereby release the dog 31 to be returned to operative positions by the spring 40. The overlying piece of butter B as the ram 21 is retracted from thereunder will drop onto the way 18 in front of said ram and the gear 61 will move out of mesh with the gear 49 and again permit the ram 21 to be projected by a step by step movement to feed the butter to the cutting wire 22.

What I claim is:

1. A device of the class described comprising a combined cutter and turner mounted for compound bodily movements to produce first a cutting action and thereafter a turning action.

2. A device of the class described comprising a frame having a cutting member and a combined spacer and turner arranged to follow the cutting member, said frame being mounted for raising and lowering movements and for lateral swinging movement at the completion of its lowering movement.

3. A device of the class described comprising a yoke-like frame having on its legs upper and lower pairs of guides mounted in vertical guide slots having at their lower ends cam-acting extensions for imparting lateral swinging movement to the frame, means for raising and lowering the frame, a cutting wire connected to and extending between the legs of the frame, and a combined spacer and turner on the frame above the cutting wire.

4. A device of the class described comprising a cutter, a feed device for feeding materials to the cutter, ratchet teeth on the feed device, a yieldingly held dog cooperating with the ratchet teeth, manually controlled means including a yieldingly retracted plunger for operating the dog to impart a step of movement to the feed device, driving means for operating the cutter in timed relation to the movement of the feed device, and automatic means controlled by the feed device for resetting the same at the completion of its feeding movement and for releasing the dog from the ratchet teeth to permit said resetting of the feed device.

5. The structure defined in claim 4 in which the driving means includes a gear, and in further combination with an intermittent gear co-operating with said gear, of a link crank connected to the intermittent gear and attached to the feed device, said link being arranged to move the intermittent gear into mesh with the gear at the completion of the feeding action of the feed device for resetting the same, said link having a cam surface arranged to move the dog into an inoperative position and hold the same to permit said resetting of the feed device.

6. A device of the class described comprising a cutter, a feed device for feeding materials to the cutter, manually controlled means including a yieldingly retracted plunger for imparting step by step movement to said feed device, driven connections for operating the cutter, and a source of electrical energy for operating said connections and having a normally open switch, said plunger being arranged to close the switch during its projecting movement, said connections including a member for retaining the plunger projected to hold the switch closed for a predetermined period of time and then release the same, said member being in the form of a wheel having a peripheral notch, said plunger having a part which extends into said notch when the plunger is retracted and which is moved out of the notch when said plunger is projected, said wheel serving as a stop to hold the plunger projected with the switch closed until said notch is again brought into registration with said part.

7. A device of the class described comprising a cutter, a feed device for feeding materials to the cutter, manually controlled means including a yieldingly retracted plunger for imparting step by step movement to said feed device, a shaft, operating connections from the shaft to the cutter, an electric motor having a normally open control switch, driving connections from the motor to the shaft including a loose gear on the shaft, and an overrunning clutch connecting the gear to the shaft, said plunger being arranged to close the switch during its projecting movement, a wheel on the shaft having a peripheral notch, said plunger having a part which extends into said notch when the plunger is retracted and which is moved out of the notch when the plunger is projected, said wheel serving as a stop to hold the plunger projected with the switch closed until said notch is again brought into registration with said part.

8. A device of the class described, a cutter, a feed device, manually operated propelling means for the feed device, operating mechanism for the cutter including an electric motor having a normally open control switch arranged to be closed by the propelling means.

9. The structure defined in claim 8 in which the operating mechanism is provided with means for holding the propelling means with the switch closed for a predetermined period of time and then release the same and permit the switch to open.

10. The structure defined in claim 8 which further includes operating connections set in action by the feed device and actuated by the operating mechanism for resetting the feed device.

In testimony whereof I affix my signature.

CLIFFORD W. KUBON.